US012809467B1

(12) United States Patent
Fahrenkopf et al.

(10) Patent No.: US 12,809,467 B1
(45) Date of Patent: Nov. 24, 2026

(54) SYSTEM AND METHOD FOR HAPTIC OUTPUT

(71) Applicant: APPLE INC., Cupertino, CA (US)

(72) Inventors: Max Fahrenkopf, Palo Alto, CA (US); Matthew D. Fortier, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/820,713

(22) Filed: Aug. 30, 2024

Related U.S. Application Data

(60) Provisional application No. 63/541,139, filed on Sep. 28, 2023.

(51) Int. Cl.
*G06F 3/01* (2006.01)

(52) U.S. Cl.
CPC .................................... *G06F 3/016* (2013.01)

(58) Field of Classification Search
CPC ....................................................... G06F 3/016
See application file for complete search history.

(56) References Cited

U.S. PATENT DOCUMENTS

| | | | |
|---|---|---|---|
| 5,789,890 | A | 8/1998 | Genov et al. |
| 6,121,743 | A | 9/2000 | Genov et al. |
| 6,995,536 | B2 | 2/2006 | Challoner |
| 7,161,322 | B2 | 1/2007 | Wang et al. |
| 7,593,030 | B2 | 9/2009 | Wang et al. |
| 7,844,397 | B2 | 11/2010 | Lund et al. |
| 8,260,460 | B2 | 9/2012 | Sanders et al. |
| 8,350,843 | B2 | 1/2013 | Rogowitz et al. |
| 8,351,773 | B2 | 1/2013 | Nasiri et al. |
| 8,583,282 | B2 | 11/2013 | Angle et al. |
| 8,994,776 | B2 | 3/2015 | Sutherland et al. |
| 9,082,270 | B2 | 7/2015 | Bogsanyi |
| 9,273,946 | B2 | 3/2016 | Siercks |
| 9,327,397 | B1 | 5/2016 | Williams et al. |
| 9,520,036 | B1 | 12/2016 | Buuck et al. |
| 9,533,411 | B2 | 1/2017 | Jacobsen et al. |
| 9,535,501 | B1 | 1/2017 | Moussette et al. |
| 9,549,781 | B2 | 1/2017 | He et al. |

(Continued)

FOREIGN PATENT DOCUMENTS

| | | | |
|---|---|---|---|
| JP | 2004147279 | A | 5/2004 |
| TW | I353503 | B | 12/2011 |

OTHER PUBLICATIONS

Salisbury, K., et al., "Haptic Rendering: Introductory Concepts", IEEE Computer Society, IEEE Computer Graphics and Applications, Mar./Apr. 2004 (9 pp).

(Continued)

*Primary Examiner* — Robert J Michaud
(74) *Attorney, Agent, or Firm* — Young Basile Hanlon & MacFarlane, P.C.

(57) ABSTRACT

A device includes a controller configured to sense an external force that is applied by a user to reposition an end part of a device around a first axis, determine a positioning force for one or more actuators according to the external force to allow repositioning of the end part in response to the external force, determine a haptic output force, determine a force command by combining the positioning force and the haptic output force, and provide haptic output by controlling operation of the one or more actuators according to the force command.

25 Claims, 6 Drawing Sheets

(56) References Cited

U.S. PATENT DOCUMENTS

| | | | |
|---|---|---|---|
| 9,678,102 B2 | 6/2017 | Ho et al. | |
| 9,823,631 B1 | 11/2017 | Loo et al. | |
| 9,849,595 B2 | 12/2017 | Wang et al. | |
| 9,919,424 B1 | 3/2018 | Devengenzo | |
| 9,921,652 B2 | 3/2018 | Moussette et al. | |
| 9,977,500 B2 | 5/2018 | Westerman et al. | |
| 10,137,011 B2 | 11/2018 | Herr et al. | |
| 10,328,836 B2 | 6/2019 | Purwin et al. | |
| 10,353,491 B2 | 7/2019 | Bruza et al. | |
| 10,357,881 B2 | 7/2019 | Faridi et al. | |
| 10,391,636 B2 | 8/2019 | Breazeal | |
| 10,415,286 B1 | 9/2019 | Porcella et al. | |
| 10,534,431 B2 | 1/2020 | Erivantcev et al. | |
| 10,551,923 B2 | 2/2020 | Pirasmepulkul et al. | |
| 10,555,865 B2 | 2/2020 | Zhang et al. | |
| 10,635,174 B2 | 4/2020 | Battlogg | |
| 10,689,831 B2 | 6/2020 | Kean et al. | |
| 10,798,339 B2 | 10/2020 | McMillan et al. | |
| 10,828,527 B2 | 11/2020 | Mahoney et al. | |
| 10,975,926 B2 | 4/2021 | Battlogg | |
| 10,976,827 B2 | 4/2021 | Battlogg | |
| 10,976,863 B1 | 4/2021 | Erivantcev et al. | |
| 10,987,192 B2 | 4/2021 | Garcia Kilroy et al. | |
| 11,054,923 B2 | 7/2021 | Erivantcev et al. | |
| 11,265,469 B1 | 3/2022 | Gangwal et al. | |
| 11,305,431 B2 | 4/2022 | Ghazaei Ardakani et al. | |
| 11,360,561 B2 | 6/2022 | Richter et al. | |
| 11,413,210 B2 | 8/2022 | Contreras-Vidal et al. | |
| 11,425,412 B1 | 8/2022 | Gigliotti et al. | |
| 11,430,170 B1 | 8/2022 | Sivapurapu et al. | |
| 11,610,476 B2 | 3/2023 | Bataillou et al. | |
| 2004/0204059 A1 | 10/2004 | Wong et al. | |
| 2004/0232632 A1 | 11/2004 | Beck et al. | |
| 2006/0190136 A1 | 8/2006 | Boyer | |
| 2007/0013336 A1 | 1/2007 | Nowlin et al. | |
| 2007/0055289 A1 | 3/2007 | Scouten et al. | |
| 2007/0150107 A1 | 6/2007 | Ogawa et al. | |
| 2007/0201035 A1 | 8/2007 | Dresel | |
| 2009/0102620 A1 | 4/2009 | Kato et al. | |
| 2009/0204261 A1 | 8/2009 | Strand et al. | |
| 2010/0094312 A1 | 4/2010 | Ruiz Morales et al. | |
| 2010/0152899 A1 | 6/2010 | Chang et al. | |
| 2010/0188267 A1 | 7/2010 | Hanlon et al. | |
| 2010/0228265 A1 | 9/2010 | Prisco | |
| 2011/0004343 A1 | 1/2011 | Iida | |
| 2011/0052366 A1 | 3/2011 | Bonin et al. | |
| 2011/0071347 A1 | 3/2011 | Rogers et al. | |
| 2011/0071541 A1 | 3/2011 | Prisco et al. | |
| 2011/0071544 A1 | 3/2011 | Steger et al. | |
| 2011/0160745 A1 | 6/2011 | Fielding et al. | |
| 2011/0234484 A1 | 9/2011 | Ogawa et al. | |
| 2011/0242158 A1 | 10/2011 | Takata et al. | |
| 2011/0264259 A1 | 10/2011 | Boyer et al. | |
| 2012/0078416 A1 | 3/2012 | Iba et al. | |
| 2012/0173106 A1 | 7/2012 | Takenaka et al. | |
| 2013/0013108 A1 | 1/2013 | Jacobsen et al. | |
| 2013/0041219 A1 | 2/2013 | Hasegawa et al. | |
| 2013/0325030 A1 | 12/2013 | Hourtash et al. | |
| 2013/0345869 A1 | 12/2013 | Chen et al. | |
| 2014/0039517 A1 | 2/2014 | Bowling et al. | |
| 2014/0107843 A1 | 4/2014 | Okazaki | |
| 2014/0114479 A1 | 4/2014 | Okazaki | |
| 2014/0153168 A1 | 6/2014 | Hida | |
| 2014/0222207 A1 | 8/2014 | Bowling et al. | |
| 2014/0257569 A1 | 9/2014 | Yip et al. | |
| 2014/0267114 A1 | 9/2014 | Lisseman et al. | |
| 2015/0019013 A1 | 1/2015 | Rose et al. | |
| 2015/0130730 A1 | 5/2015 | Harley et al. | |
| 2015/0198983 A1 | 7/2015 | Faith et al. | |
| 2015/0201160 A1 | 7/2015 | Polyakov et al. | |
| 2015/0224639 A1 | 8/2015 | Dockter | |
| 2016/0123059 A1 | 5/2016 | Liu | |
| 2016/0182857 A1 | 6/2016 | Avrahami et al. | |
| 2016/0227193 A1 | 8/2016 | Osterwood et al. | |
| 2017/0131770 A1 | 5/2017 | Keller et al. | |
| 2017/0165567 A1 | 6/2017 | Walters | |
| 2017/0173262 A1 | 6/2017 | Veltz | |
| 2017/0343695 A1 | 11/2017 | Stetson et al. | |
| 2018/0064498 A1 | 3/2018 | Kapadia et al. | |
| 2018/0126553 A1 | 5/2018 | Corkum et al. | |
| 2018/0257688 A1 | 9/2018 | Carter et al. | |
| 2018/0283016 A1 | 10/2018 | Telleria et al. | |
| 2018/0341384 A1 | 11/2018 | Dubovsky et al. | |
| 2019/0061941 A1 | 2/2019 | Zhang et al. | |
| 2019/0093373 A1 | 3/2019 | Telleria et al. | |
| 2019/0209080 A1 | 7/2019 | Gullotti et al. | |
| 2019/0375102 A1 | 12/2019 | Wang et al. | |
| 2020/0021675 A1 | 1/2020 | Cheng | |
| 2020/0088251 A1* | 3/2020 | Battlogg | G06F 3/016 |
| 2020/0319768 A1 | 10/2020 | Drake et al. | |
| 2020/0379593 A1* | 12/2020 | de Vries | G06F 3/0412 |
| 2021/0096648 A1 | 4/2021 | Summit | |
| 2021/0114199 A1 | 4/2021 | Mhd et al. | |
| 2021/0129329 A1 | 5/2021 | Pipe-Mazo et al. | |
| 2021/0129339 A1 | 5/2021 | Pipe-Mazo et al. | |
| 2021/0392255 A1 | 12/2021 | Zhu et al. | |
| 2021/0398360 A1 | 12/2021 | Drummond et al. | |
| 2022/0015935 A1 | 1/2022 | Hochmann et al. | |
| 2022/0146617 A1 | 5/2022 | Nakagawa et al. | |
| 2024/0333831 A1 | 10/2024 | Pedan et al. | |
| 2024/0419220 A1 | 12/2024 | Liu et al. | |

OTHER PUBLICATIONS

Hayward, V., et al., "Haptic Interfaces And Devices", Emerald Group Publishing Limited, <www.emeraldinsight.com/0260-2288.htm,> Sensor Review, vol. 24, No. 1, 2004 (14 pp).

3D Systems, "Phantom Premium Haptic Devices", <www.3dsystems.com/haptics-devices/3d-systems-phantom-premium,> Downloaded Aug. 6, 2024 (5 pp).

* cited by examiner

SYSTEM AND METHOD FOR HAPTIC OUTPUT

CROSS-REFERENCE TO RELATED APPLICATIONS

This application claims the benefit of, and priority to, U.S. Provisional Application No. 63/541,139, filed on Sep. 28, 2023, the contents of which are hereby incorporated by reference herein for all purposes.

FIELD

The present disclosure relates generally to the field of haptic output for electronic devices.

BACKGROUND

Devices can be used to allow communication between persons who are separated by large distances, by transmission of information between the devices using communications networks. As examples, communications between devices can facilitate audio communications, video communications, cooperative gameplay, and other types of interactions between persons who are not located in the same physical space.

SUMMARY

A first aspect of the disclosure is a device. The device includes a member that connects a base part of the device to an end part of the device to allow movement of the end part with respect to the base part. The device also includes one or more actuators that are configured to apply force to the end part of the device. The device also includes a controller configured to sense an external force that is applied by a user to reposition the end part around a first axis and determine a positioning force to allow repositioning of the end part in response to the external force. The controller is further configured to determine a haptic output force, determine a force command by combining the positioning force and the haptic output force, and provide haptic output by controlling operation of the one or more actuators according to the force command.

In some implementations of the device, the haptic output force is determined based on a haptic output pattern. The controller may be further configured to receive information defining the haptic output pattern from a software application executed by the controller. The haptic output pattern may be applied as a function of time relative to a starting time for the haptic output pattern, or as a function of position relative to a starting position for the haptic output pattern. The haptic output pattern may include identical repeating pulses, or identical repeating pulse groups that each include two or more different pulses.

In some implementations of the device, the haptic output force is determined based on a haptic output function intended to simulate a mechanical system.

In some implementations of the device, the positioning force is determined to allow repositioning of the end part in response to an external force applied to the end part by a user along a first axis. The member may be configured to allow the repositioning of the end part by rotation of the end part relative to the base part. The haptic output force may be applied along the first axis in opposition to a direction of the external force applied to the end part by the user, or along a second axis that is different than the first axis, such as an axis that is orthogonal to the first axis.

A second aspect of the disclosure is a method for providing haptic output. The method includes sensing an external force that is applied by a user to reposition an end part of a device around a first axis and determining a positioning force for one or more actuators external force to allow repositioning of the end part in response to the external force. The method also includes determining a haptic output force. The method also includes determining a force command by combining the positioning force and the haptic output force. The method also includes providing haptic output by controlling operation of the one or more actuators to apply force to the end part according to the force command.

In some implementations, determining the haptic output force further comprises determining the haptic output force using a haptic output pattern. In some implementations, determining the haptic output force further comprises receiving information defining the haptic output pattern from a software application.

In some implementations, the haptic output pattern is applied as a function of time relative to a starting time for the haptic output pattern. In some implementations, the haptic output pattern is applied as a function of position relative to a starting position for the haptic output pattern. In some implementations, determining the haptic output force further comprises determining the haptic output force based on a haptic output function intended to simulate a mechanical system.

In some implementations, in response to the external force, the controller determines the positioning force to remove the positioning force with respect to the first axis and to maintain the positioning force with respect to a second axis that is different than the first axis.

A third aspect of the disclosure is a non-transitory computer-readable storage device comprising program instructions. When executed by a processor, the program instructions cause the processor to perform operations. The operations include sensing an external force that is applied by a user to reposition an end part of a device around a first axis, determining a positioning force for one or more actuators external force to allow repositioning of the end part in response to the external force, and determining a haptic output force. The operations also include determining a force command by combining the positioning force and the haptic output force and providing haptic output by controlling operation of the one or more actuators to apply force to the end part according to the force command.

DETAILED DESCRIPTION

Figure 1A:
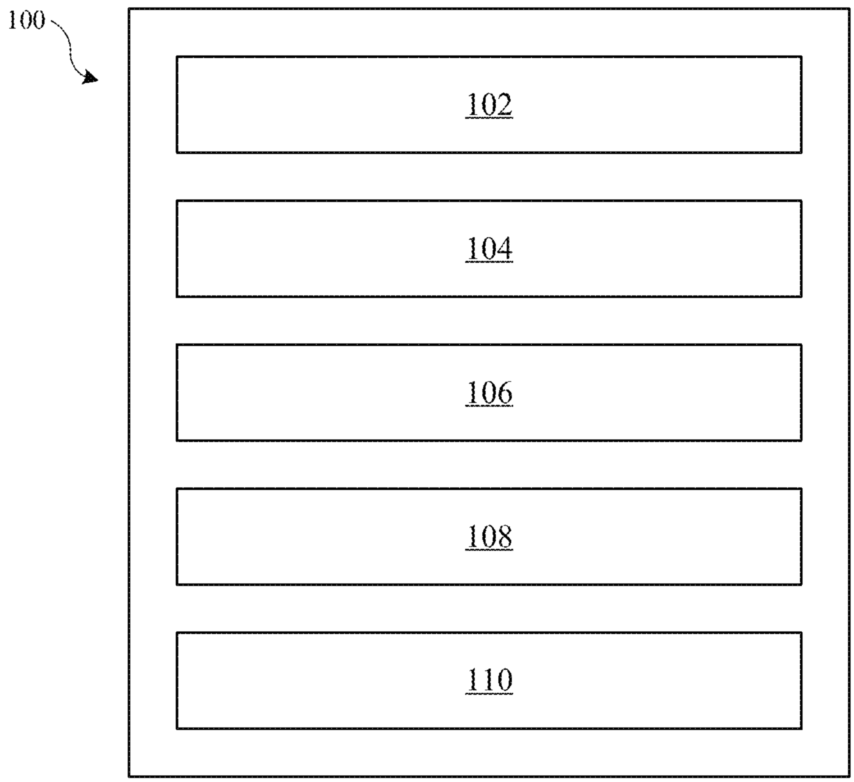
FIG. 1A is a block diagram of a device.

FIG. 1A is a block diagram of a device 100 according to an example. The device 100 is an electronic device that is intended to be used by a user, such as by displaying content that can be seen by the user, outputting audio that can be heard by the user, and recognizing user inputs, by which the user is able to control functionality of the device 100. The device 100 includes an end part 104 that is coupled to a base part 102 by a member 106. The end part 104 can be called a distal part. The end part 104 of the device 100 is intended to be adjustably repositionable relative to the base part 102 using the member 106. Thus, for example, the end part 104 may be moved by the user to a convenient location at which functionality of the components that are included in the end part 104 may be utilized by the user.

The end part 104 includes components that enable functionality of the device 100, such as a display or other input and output equipment, to allow a user to interact with the device 100. As examples, the end part 104 of the device 100 may include input components that allow a user to interact with the device 100 through contact-based gesture inputs, non-contact gesture inputs, operation of physical buttons, manual manipulation of the end part 104 or a portion thereof, spoken inputs, and/or visual inputs.

The base part 102 is a structure that supports the end part 104. The base part 102 is configured to be disposed on or coupled to an external structure 105, such as a surface (e.g., a wall, a post/pillar, a table, a countertop, etc.) or an object (e.g., a cabinet, etc.). As examples, the base part 102 may rest on the external structure 105, such that it can be picked up and moved, or the base part 102 may be coupled to the external structure 105 by suitable means such as mechanical fasteners. In the implementations described herein, the base part 102 remains stationary with respect to the external structure 105 unless it is manually repositioned by a user (e.g., picked up and moved).

The base part 102 is configured support the device 100 by connection of the end part 104 to the base part 102 by the member 106. The member 106 is configured to allow repositioning of the end part 104 with respect to the base part 102, including manual repositioning and/or motorized repositioning, as will be described. As examples, the member 106 may be or include a hinge, a pivot, a ball joint, a spring, or any other suitable structure that allows the end part 104 to move relative to the base part 102. The member 106 may include multiple joints that, together, allow the end part 104 to be moved in a desired manner with respect to the base part 102. As an example, many known configurations can be used to implement motion in one, two, or three degrees of translational freedom, and/or in one two, or three degrees of rotational freedom. As one example, the member 106 could be implemented according to six-axis robot configurations. An exemplary implementation of the member 106 will be discussed further herein.

It should be noted that the names "base part" and "end part" are terms of convenience that indicate that the end part 104 is a portion of the device 100 (e.g., a first portion) that is configured to move relative to the base part 102 utilizing an intervening structure that facilitates the motion, such as the member 106 (e.g., a second portion). These terms are not intended to limit the structural configuration to one in which the base part 102 and the end part 104 are at opposed ends of a kinematic chain with no further elements connected outward from them. On the contrary, the base part 102 and the end part 104 may be positioned at an intermediate locations along a kinematic chain, so long as the end part 104 is movable with respect to the frame of reference of the base part 102. In some examples, the base part 102 is itself moveable relative to the surface on which it is placed, such as a surface defined by the external structure 105. For instance, the base part 102 may rotate about the surface on which it is placed, along an axis that is perpendicular to the plane of the surface.

The device 100 includes a controller 108 that is configured to exercise control over the systems of the device 100 in order to implement the functionality described herein. Such processes can be implemented using one or more computing devices, such as one or more computing devices incorporated in the controller 108, or such as the controller 108 together with another computing device. As an example, the processes described herein and the steps thereof may be implemented in the form of computer program instructions that are executable by one or more computing devices, wherein the instructions, when executed by the one or more computing devices, cause the one or more computing devices to perform functions that correspond to the steps of the processes. In an example, the controller 108 may include one or more processors, a memory that is configured for short-term storage of computer program instructions that are executable by the one or more processors, a long term storage device that is configured for long-term storage of the computer program instructions and other information, and/or other computing components. Other implementations are possible, and the controller 108 may be implemented in the form of, for example, a solid-state circuit, an application specific integrated circuit, a field programmable gate array, or another suitable form. The controller 108 may be configured to communicate with various input devices and output devices that allow a user to interact with the controller 108.

The device 100 includes an actuator system 110 including one or more actuators, which is configured to apply force to the end part 104. As examples, the actuator system 110 may be utilized to apply force to the end part 104 to move the end part 104 with respect to the base part 102, to apply force to the end part 104 to maintain a position of the end part 104 with respect to the base part 102 (e.g., in opposition to the force of gravity), to apply a feedback force (e.g., a feedback force or feedback torque) to the end part 104 during manual repositioning of the end part 104 with respect to the base part 102, and to apply haptic effects to the end part 104 to provide information to the user of the device 100 while the user is touching, grasping, or otherwise in physical contact with the end part 104 of the device 100. As one example, the controller 108 may provide a command to the actuator system 110 that causes the actuator system 110 to move the end part 104 of the device to a specified position, according to a velocity value, or according to an acceleration value. As another example, the controller 108 may provide a command to the actuator system 110 that causes the actuator system 110 to apply force feedback to the end part 104 in opposition to an external force that is applied to the end part 104. As one example, the controller 108 may provide a command to the actuator system 110 that causes the actuator system 110 to apply a haptic effect to the end part 104 according to a specified haptic pattern.

Figure 1B:
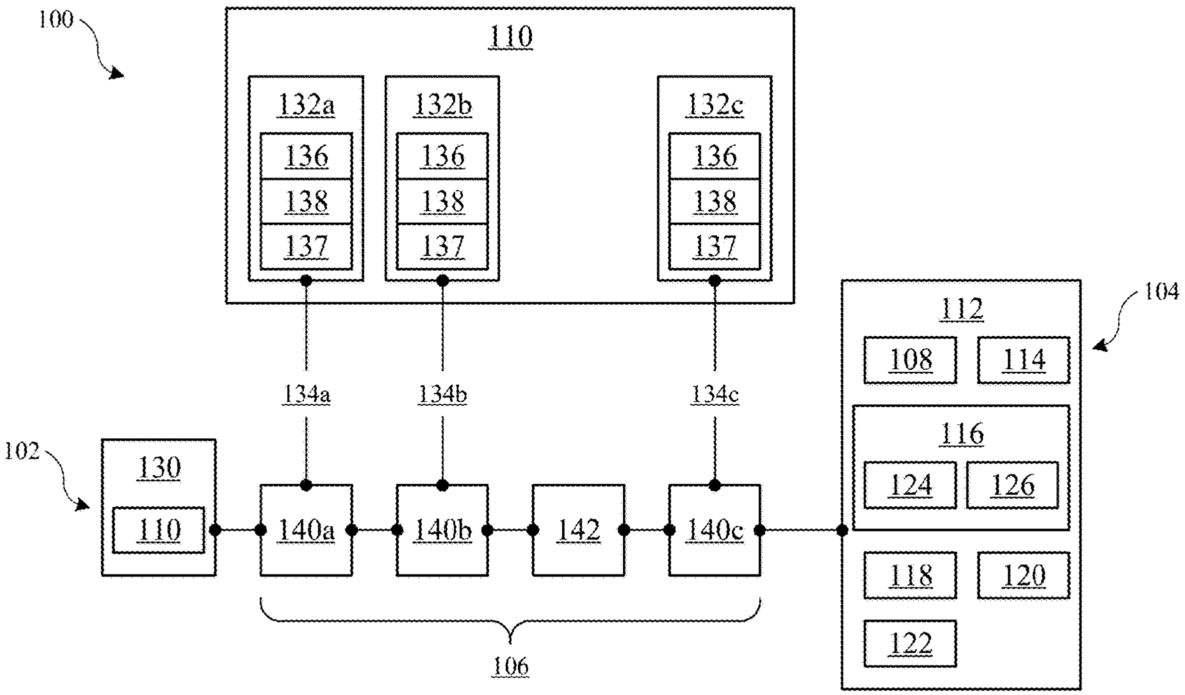
FIG. 1B is a schematic illustration of the device.

FIG. 1B is a schematic side-view illustration of the device 100. The configuration shown in FIG. 1B is an example of a structural configuration that can be used to implement the device 100 and the functionality described herein. It should be understood, however, that the variations of this structural configuration are possible.

The end part 104 of the device 100 includes an end housing 112. The end housing 112 is configured to support, contain, and interconnect some components of the device 100. Thus, some components of the device 100 are included in the end part 104 of the device 100 and are coupled to the end housing 112 of the end part 104. As an example, the controller 108 may be located in the end housing 112. The end housing 112 may be a rigid structure that defines an internal space in which portions of the end part 104 of the device 100 are housed. Portions of some of the components that are included in the end part 104 may be exposed to an exterior of the end housing 112 as is appropriate, for example, to allow those components to be viewed or manipulated. In addition, in the illustrated implementation, the end housing 112 is coupled to the member 106 in order to the connect the end part 104 to the base part 102 through the member 106.

The end part 104 of the device 100 may include components such as sensors, input devices, and output devices. In the illustrated implementation, the end part 104 of the device 100 includes motion sensors 114, a touch sensitive display 116, a loudspeaker 118, a camera 120, and a microphone 122. These components may be conventional. In alternative implementations, some of these components may be relocated to another portion of the device 100, such as the base part 102, without a change in function.

In the illustrated implementation, the controller 108 is configured to communicate (e.g., via wired or wireless connections) with the motion sensors 114, the touch sensitive display 116, the loudspeaker 118, the camera 120, and the microphone 122, allowing the controller 108 to receive inputs from these components and/or to send commands to these components to cause the components to perform various functions. The controller 108 is further configured to communicate with other components that are included in the device 100, as will be discussed further herein.

The device 100 includes the motion sensors 114 (e.g., one or more motion sensors) in order to allow the controller 108 to track the position of the end part 104 with respect to the base part 102. The motion sensors 114 are coupled to the end part 104 and configured to output a motion signal representing movement of the end part 104 relative to the base part 102. The motion sensors 114 may be configured to directly output a measured acceleration of the motion sensor and/or a measured velocity of the motion sensors 114. Acceleration and/or velocity may be measured in three linear directions (e.g., X, Y, and Z directions) and/or in three rotational directions (e.g., pitch, roll, and yaw directions) using suitable components such as a three-axis accelerometer and/or a three-axis rate gyroscope. As an example, each of the motion sensors 114 may be implemented using an inertial measurement unit (IMU). Two or more of the motion sensors 114 may be included in the end part 104 to improve motion tracking performance and allow for better understanding of the movement of the end part 104. The signals from the motion sensors 114 may be combined using geometric techniques and/or filtering techniques. Alternatively, a single motion sensor may be used.

The motion signal output by the motion sensors 114 is received by the controller 108, which is electrically connected to the motion sensors 114. The controller 108 is configured to interpret the motion signal output by the motion sensors 114. In particular, the controller 108 may be configured to analyze the motion signal output by the motion sensors 114 and/or other additional signals that are output by additional sensors and provided to the controller 108. By analyzing one or more of these signals, the controller 108 is able to detect and measure a force applied to the end part 104 and to determine a location of the applied force relative to the end part 104. In addition, the controller 108 determines and tracks multiple positions of the end part 104 over time in order to sense and understand movement. For example, multiple samples obtained over time can be interpreted to determine velocity, displacement, rotation, force, contacts (e.g., one or more contacts by the user with the end part 104), and other motion parameters that describe the motion of the end part 104. Any or all of these characteristics that are included in or determined based on the motion signal may be used as a basis for making determinations (e.g., by the controller 108) in the systems and methods described herein.

The touch sensitive display 116 includes a display screen 124 and a touch input device 126. As an example, the touch input device 126 may be an overlay that is positioned on the display screen 124 such that light emitted by the display screen 124 passes through the touch input device 126. A transparent cover (e.g., formed from plastic or glass) may be placed over the display screen 124 and the touch input device 126 without affecting operation of the touch input device 126. As an example, a transparent cover may define an interaction surface that can be touched by the user and through which touches can be sensed by the touch input device 126 and registered as touch events. A transparent cover may also serve to protect the display screen 124 and the touch input device 126. In the description herein, contact with a transparent cover or contact with the display screen 124 is equivalent to contact with the touch input device 126, and descriptions of such contact are interchangeable.

The display screen 124 is configured to present visual content to a user. The display screen 124 may be used to present user interface elements, still images, videos, and other visual content. The display screen 124 may be, as examples, a liquid crystal display (LCD), a light-emitting diode (LED) display, an organic light-emitting diode display, or any other suitable type of visual display. The touch input device 126 is a touch sensor panel that is implemented according to touch sensing technologies such as capacitive or resistive touch sensing to perceive touches by a portion of the user's body (e.g., a finger) or by a stylus or other implement. The touch input device 126 outputs a touch signal that represents contact, and the touch signal may be provided to the controller 108 by the touch input device 126. The touch signal may be interpreted to determine characteristics of the contact, such as the position, size, shape, and force associated with the contact. These characteristics may be tracked over time by the controller 108 to detect a gesture that is being made by the user of the device 100 through contact with the touch input device 126.

The display screen 124 and the touch input device 126 of the touch sensitive display 116 are coupled to the end housing 112 in a manner that allows viewing of the display screen 124 and user interaction with the touch input device 126. The transparent cover 128 may be coupled to the end housing 112 such that an exterior surface of the transparent cover 128 is substantially flush relative to an exterior surface of the end housing 112.

The loudspeaker 118 is configured to generate sound, for example, in response to an audio signal provided by the controller 108. The camera 120 may be a digital video camera or a digital still camera configured to output information defining that, when interpreted defines one or more digital images (e.g., comprising pixels). The one or more images may be obtained by the camera 120 in response to receiving a command from the controller 108, and the images may be provided (e.g., by a wired signal transmission) to the controller 108 by the camera 120. The microphone 122 is configured to output an audio signal representing sound from the environment around the device 100. The audio signal from the microphone 122 may be provided to the controller 108 by the camera 120.

The base part 102 of the device 100 includes a base housing 130. The base housing 130 is configured to support, contain, and interconnect some components of the device 100. Thus, some components of the device 100 are included in base part 102 of the device 100 and are coupled to the base housing 130 of the base part 102. As an example, the base housing 130 may be a rigid structure that defines an internal space in which portions of base part 102 of the base part 102 are housed. Portions of some of the components that are included in the base part 102 may be exposed to an exterior of the base part 102 as is appropriate.

In the illustrated implementation, components of the actuator system 110 are located in the base housing 130. The base housing 130 may contain or support additional components, such as a battery, power supply, and/or control elements like buttons or switches for user control. In addition, in the illustrated implementation, the base housing 130 is coupled to the member 106 in order to the connect the end part 104 to the base part 102 through the member 106.

In the illustrated implementation, the actuator system 110 includes a first actuator 132*a*, a second actuator 132*b*, and a third actuator 132*c*, which are each configured to actuate motion of a respective portion of the member 106. The first actuator 132*a* is coupled to a portion of the member 106 by a first drive mechanism 134*a*, the second actuator 132*b* is coupled to a portion of the member 106 by a second drive mechanism 134*b*, and the third actuator 132*c* is coupled to a portion of the member 106 by a third drive mechanism 134*c*. As examples, the first drive mechanism 134*a*, the second drive mechanism 134*b*, and the third drive mechanism 134*c* may each be or include a rigid link, cable system, or other mechanical system to is operable to transfer motion to portions of the member 106. Thus, the actuator system 110 may be configured to actuate motion of the member 106 using the first actuator 132*a*, the second actuator 132*b*, and the third actuator 132*c* in response to commands received from the controller 108 in order to adjust the orientation of the end part 104 relative to the base part 102.

The member 106 is configured to support the end part 104 with respect to the base part 102, such as by connection of the member 106 to the end housing 112 to the base housing 130. The member 106 may be configured as an arm that includes a first joint 140*a*, a second joint 140*b*, a third joint 140*c*, and a shaft 142, all of which are coupled between the end part 104 and the base part 102 to support the end part 104 with respect to the base part 102 and to allow movement of the end part 104 with respect to the base part 102.

Figure 1C:
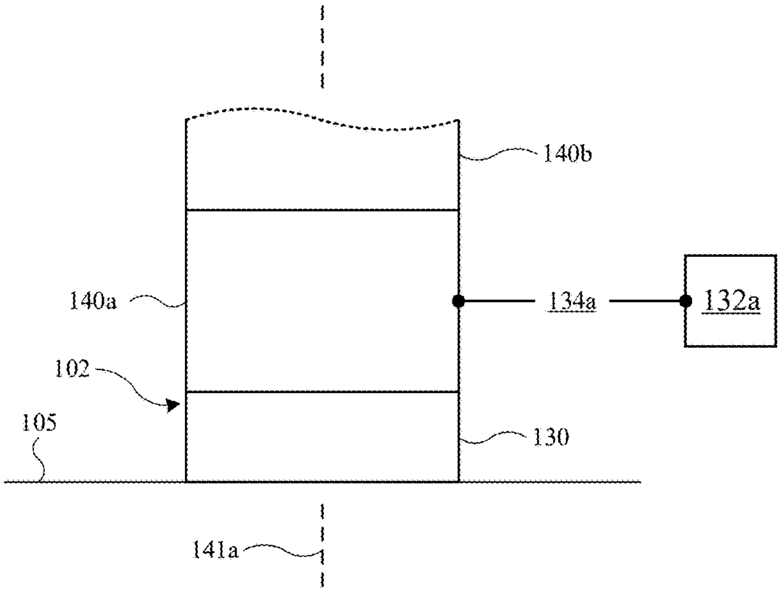
FIGS. 1C-1E are schematic illustrations of joints of the device.

As shown in FIG. 1C, which is a schematic illustration of the first joint 140*a* of the device 100, the first joint 140*a* is a pivot joint that is coupled to the base part 102 to allow rotation of the member 106 with respect to the base part 102 around a first axis 141*a*, thereby defining a first rotational degree of freedom for movement of the end part 104 with respect to the base part 102. As an example, the first axis 141*a* may be oriented such that it is orthogonal to a bottom surface or top surface of the end part 104. Thus, for example, if the base part 102 is supported by a surface (e.g., a counter), the first axis 141*a* may extend generally orthogonal to and upward from the surface.

In the illustrated implementation, because the first joint 140*a* connects the remainder of the member 106 to the base part 102, rotation at the first joint 140*a* rotates the second joint 140*b*, the third joint 140*c*, the shaft 142 and the end part 104 around the first axis 141*a* with respect to the base part 102. Because the first joint 140*a* is coupled to the base part 102, a first portion of the first joint 140*a* may be fixed to the base part 102 and a second portion of the first joint 140*a* may be rotatable with respect to the base part 102. In some implementations, the first part of the first joint 140*a* is coupled to an internal structure (e.g., a frame) of the base part 102, and the second part of the first joint 140*a* may be coupled to the base housing 130, such that the base housing 130 rotates when the first joint rotates. In another implementation, the base housing 130 may include a first portion and a second portion, where the first portion of the base housing 139 is fixed relative to an internal structure of the base part 102 and the second portion of the base housing 130 is rotatable with respect to the first portion of the base housing 130 and rotates with the first joint 140*a*.

Figure 1D:
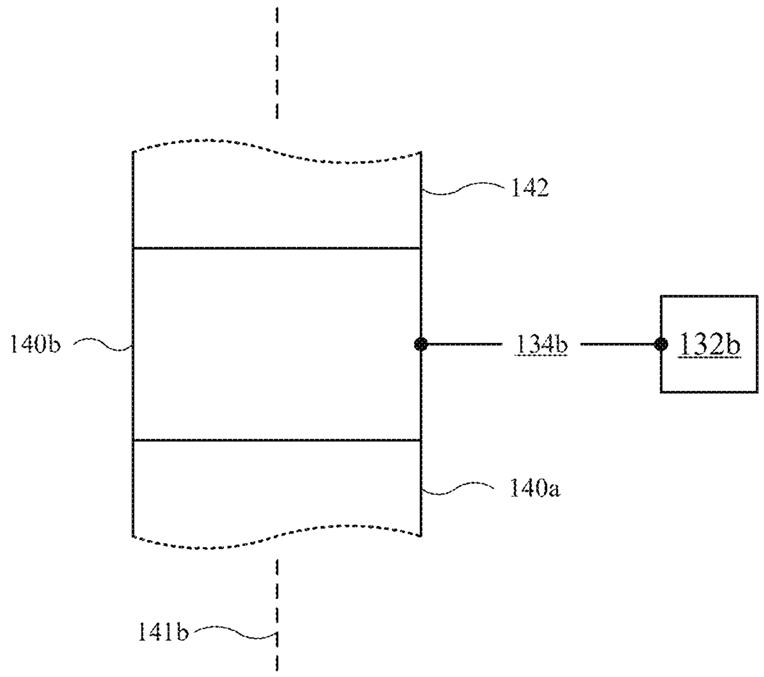

As shown in FIG. 1D, which is a schematic illustration of the second joint 140*d* of the device 100, the second joint 140*b* is a pivot joint that included in the member 106 to allow rotation of a portion of the member 106 around a second axis 141*b*, which is oriented differently (e.g., not along the same axis) than the first axis 141*a*, thereby defining a second rotational degree of freedom for movement of the end part 104 with respect to the base part 102. As an example, the second axis 141*b* may be oriented such that it is perpendicular to the first axis 141*a*. Other implementations are possible. The second joint 140*b* may include a first portion that is coupled to the first joint 140*a*, and a second portion that is coupled to the shaft 142 in order allow rotation of the shaft 142 relative to the first pivot-joint 140*a* around the second axis 141*b*.

Figure 1E:
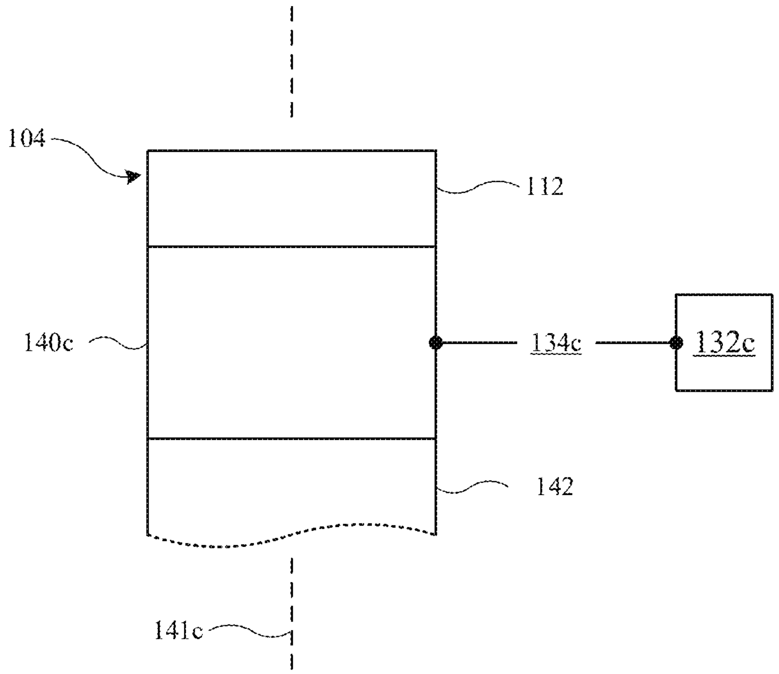

As shown in FIG. 1E, which is a schematic illustration of the third joint 140*c* of the device 100, the third joint 140*c* is a pivot joint that included in the member 106 to allow rotation of the end part 104 with respect to the member 106 around a third axis 141*c*, which is oriented differently (e.g., not along the same axis) than the first axis 141*a* and the second axis 141*b*, thereby defining a third rotational degree of freedom for movement of the end part 104 with respect to the base part 102. As an example, the third axis 141*c* may be generally parallel to but spaced from (e.g., not axially aligned with) the second axis 141*b*. The third joint 140*c* may include a first portion that is coupled to the shaft 142 and a second portion that is coupled to the end part 104, such as by connection to an internal structure thereof, to the end housing 112, or to a portion of the end housing 112.

The shaft 142 extends between the first joint 140*a* and the second joint 140*b*. The second joint 140*b* couples the shaft 142 to the first joint 140*a* for rotation of the shaft 142 and the end part 104 with respect to the base part 102 around the second axis 141*b*. The third joint 140*c* couples the shaft 142 to the end part 104, for rotation of the end part 104 with respect to the shaft 142 around the third axis 141*c*.

In some implementations, the first joint 140*a*, the second joint 140*b*, and/or the third joint 140*c* may each allow rotation in one, two, or three degrees of rotational freedom. Examples of suitable rotational joints may include revolute joints, ball joints, and gimbal joints. In some implementations, one or more of the first joint 140*a*, the second joint 140*b*, and/or the third joint 140*c* may be configured as translational joints, allowing for movement of the end part 104 with respect to the base part 102 in one, two, or three degrees of translational freedom. Examples of suitable translational joints include sliding joints, prismatic joints, and screw joints. In some implementations, the member 106 may include one or more rotational joints in combination with one or more translational joints.

Each of the first actuator 132*a*, the second actuator 132*b*, and the third actuator 132*c* may include a motor 136 having an output shaft 137 and a position encoder 138. The motor 136 may be a rotary electric motor that is configured to rotate the output shaft 137. As an example, the motor 136 may be a stepper motor configured to rotate the output shaft 137 in steps of a known angular size.

The motor 136 is configured to cause movement of the end part 104 relative to the base part 102. For example, the motor 136 of each of the first actuator 132*a*, the second actuator 132*b*, and the third actuator 132*c* may be connected to a respective portion of the member 106 by a respective one of the first drive mechanism 134*a*, the second drive mechanism 134*b*, and the third drive mechanism 134*c* to a respective one of the first joint 140*a*, the second joint 140*b*, and the third joint 140*c* to cause movement of the end part 104 relative to the base part 102.

The motor 136 is configured to operate according to a motor control signal output by the controller 108, enabling the end part 104 to reach a desired position relative to the base part 102. For example, the control signal adjusts the operation of the motor 136 to achieve a desired angular position, velocity, or torque. The controller 108 may control motion of the end part 104 using the position signal from the position encoder 138, and/or other signals, such as the motion signal from the motion sensors 114. Signals may be combined using methods such as filtering.

The position encoder 138 is configured to output a position signal representing movement of the motor 136, such as the angular position, change in position, velocity, and/or acceleration of the output shaft 137 of the motor 136. The position signal is output by a sensing mechanism of the position encoder 138, such as an optical, magnetic, or capacitive sensing mechanism. The position signal that is output to by the position encoder 138 is provided to the controller 108. Thus, using the position signal from the motor 136 associated with a respective one of the first actuator 132*a*, the second actuator 132*b*, and the third actuator 132*c*, the positions of the first joint 140*a*, the second joint 140*b*, and the third joint 140*c* can be tracked to allow determination of the position of the end part 104 with respect to the base part 102, for example, by geometric techniques.

While the member 106 includes one shaft and three joints in the illustrated implementation, it should be understood that additional shafts and/or joints may be included to change the range of motion of the member 106 and/or to add additional degrees of freedom in which the position of the end part 104 with respect to the base part 102 may be controlled. In such implementations, corresponding actuation components, such as additional actuators of the actuator system 110, may be included to cause motion of these portions of the member 106.

The controller 108 is configured to detect and interpret a gesture that is applied to the end part 104 and sensed by the touch input device 126, for example, when a portion of the device 100 corresponding to the touch input device 126 is touched by a user's finger. The touch input device 126 may be configured to output a signal representing characteristics of the gesture, such as the position, shape, size, and/or force associated with the gesture. The signal output by the touch input device 126 is interpreted by the controller 108 to identify these characteristics, use them to determine a user intention, and, in some cases, pass information representing the touch input to an application of the device 100, such as an operating system application or a non-operating system application of the device 100. As an example, signals representing gestures may be passed to applications in the form of event messages.

The position of the end part 104 with respect to the base part 102 changes during use of the device 100. As one example the position of the end part 104 may be changed by operation of the motor 136 of each of the first actuator 132*a*, the second actuator 132*b*, and the third actuator 132*c* in response to commands received by the motor 136 from the controller 108. As another example, the user may manually manipulate the end part 104 to change the position of the end part 104 with respect to the base part 102, such as by grasping the end part 104 and pushing, pulling, twisting, or otherwise manipulating it in order to reposition the end part 104 with respect to the base part 102. The controller 108 is configured to track the position, velocity, and/or acceleration of the end part 104 with respect to the base part 102 in order to allow control of positioning of the end part 104 and in order to allow control of force feedback and haptic effects. The controller 108 may also use the tracked position, velocity, and/or acceleration of the end part 104 with respect to the base part 102 in order to determine whether to transition operation of the device 100 between control modes that change how the device 100 reacts to attempts, by the user, to manually reposition the end part 104 with respect to the base part 102.

The controller 108 may be configured to determine a position of the end part 104 with respect to the base part 102 using the motion sensors 114. In one implementation, the controller 108 utilizes the motion signal output by the motion sensors 114. As an example, starting from a known position and velocity (e.g., a home position and zero velocity), acceleration values output as part of the motion signal from the motion sensors 114 may be integrated over time to determine a change in velocity of the end part 104 with respect to one or more linear and/or rotational degrees of freedom, allowing the current velocity of the end part 104 to be tracked over time. Similarly, the velocity of the end part 104 may be integrated over time to determine a change in position of the end part 104 with respect to one or more linear and/or rotational degrees of freedom, thereby allowing the position of the end part 104 with respect to the base part 102 to be tracked over time, based on the motion signal output by the motion sensors 114.

The controller 108 may be configured to determine a position of the end part 104 with respect to the base part 102 using the position encoder 138 of each of the first actuator 132*a*, the second actuator 132*b*, and the third actuator 132*c*. Starting from a known position, the position signal output by the position encoder 138 is monitored to determine a change in position of the end part 104 with respect to the base part 102. As an example, the controller 108 may use a predetermined relationship between the position signal output by the position encoder 138 and the corresponding change in position of the end part 104 with respect to the base part 102. As examples, the predetermined relationship may be a ratio, a formula, a look up table, or other manner of information. Based on the change in position of the end part 104 with respect to the base part 102 during a time period, the change in velocity of the end part 104 with respect to the base part 102 can be determined as the first derivative of the change in position and the change in acceleration of the end part 104 with respect to the base part 102 can be determined as the second derivative of the change in position.

In implementations with multiple motors that are each associated with a corresponding position encoder and which each activate a different motion (e.g., degree of freedom) of the end part 104 with respect to the base part 102 (e.g., such as the motor 136 and the position encoder 138 of each of the first actuator 132*a*, the second actuator 132*b*, and the third actuator 132*c*), the position signals output by all such position encoders may be utilized by the controller 108 to determine the change in position of the end part 104 with respect to the base part 102 in the same manner.

The controller 108 may be further configured to track the position, velocity, and/or acceleration of the end part 104 with respect to the base part 102 by combining the information output by the motion sensors 114 and the position encoder 138 of each of the first actuator 132*a*, the second actuator 132*b*, and the third actuator 132*c*. As an example, a first position estimate for the end part 104 with respect to the base part 102 may be determined using the motion signal from the motion sensors 114, a second position estimate for the end part 104 with respect to the base part 102 may be determined using the position signal from the position encoder 138 of each of the first actuator 132*a*, the second actuator 132*b*, and the third actuator 132*c*. The first position estimate and the second position estimate are combined by the controller 108 using a suitable method, such as a filtering algorithm.

The controller 108 may further be configured to determine a direction of a force applied to the end part 104 by the user. As an example, changes in position determined using the motion signal motion signal from the motion sensors 114, and/or using the position signal from the position encoder 138 of each of the first actuator 132*a*, the second actuator 132*b*, and the third actuator 132*c* may be used to determine the direction of the applied force according to the change in velocity or position of the end part 104. The magnitude of the applied force may then be derived according to the change in velocity, the mass of portions of the device 100, friction values associated the member 106, and forces applied by the actuator system 110, which can be estimated based on current draw of the first actuator 132*a*, the second actuator 132*b*, and the third actuator 132*c*, which is proportional to actuator torque.

Figure 2:
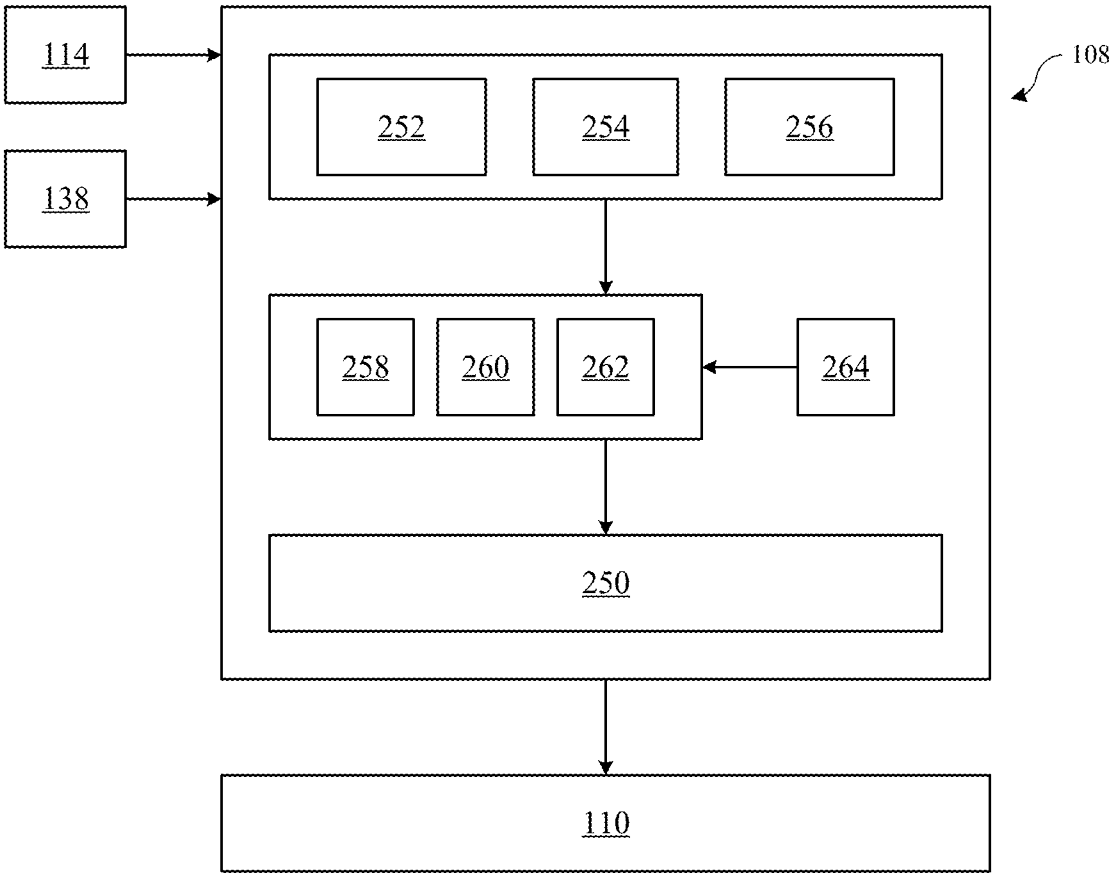
FIG. 2 is a block diagram of control of an actuator system of the device.

FIG. 2 is a block diagram illustrating control of the actuator system 110 of the device 100 by the controller 108. The controller 108 is configured to determine a force command 250 that is utilized to control operation of the actuator system 110 of the device 100. The force command 250 is determined in a manner that allows the actuator system 110 to concurrently control the position of the device 100, force feedback applied to the device 100 (e.g., to provide resistance to manual repositioning of portions of the device 100), and haptic output applied to portions of the device 100. Haptic output may be applied to portions of the device 100 for various reasons, such as to provide information to the user regarding movement of the device 100, operating states of the device 100, operating system notifications, application-specific notifications or other outputs, and/or other information regarding the device 100.

As previously described, the device 100 is configured to be moved with respect to the external structure 105, such as a surface that the device 100 is sitting on. As one example, the member 106 of the device 100 may be configured to connect the base part 102 of the device 100 to the end part 104 of the device 100 to allow movement of the end part 104. In response to an external force applied by the user to reposition the device 100, the end part 104 may be moved with respect to the base part 102, or the end part 104 and the base part 102 may both be moved with respect to the external structure 105.

The actuator system 110 (e.g., including one or more actuators such as the first actuator 132*a*, the second actuator 132*b* and the third actuator 132*c*) is configured to apply force (e.g., torque) to the device 100, such as by applying force to the end part 104 of the device 100. The actuator system 110 is utilized to control the position of the device

100, such as the position of the end part 104 with respect to the base part 102, and is also used to apply haptic output that can be felt by the user when the user is touching the device 100, such as by grasping the end part 104 of the device 100 in order to manually reposition the end part 104 with respect to the base part 102. With respect to both of positioning and haptic output, the actuator system 110 may apply force with respect to one or more linear degrees of freedom and/or with respect to one or more rotational degrees of free (e.g., along X, Y, and Z directions and/or pitch, roll, and yaw directions in cartesian space). As an example, the actuator system 110 may control positioning and haptic output with respect to the first axis 141*a*, the second axis 141*b*, and/or the third axis 141*c* of the device 100.

The actuator system 110 is controlled, in part, based on sensed conditions, including a current position 252 of the device 100, and an external force 254 that is applied to the device 100. These conditions may be sensed using inputs provided by components of the device 100, including the motion signal from the motion sensor 114, the position signal from the position encoders 138 of the actuator system 110, and information derived from those inputs.

The controller 108 is configured to determine the current position 252 for the device 100 or a portion of the device 100, such as the end part 104. In the illustrated implementation, the current position 252 represents a position of the end part 104 with respect to the base part 102. The current position 252 could alternatively represent a position of the end part 104 with respect to the external structure 105, for example, in implementations in which the base part 102 is movable by the actuator system 110 with respect to the external structure 105 (e.g., by rotation of the base part 102 with respect to the external structure 105). As an example, the current position 252 may be expressed as a position of the end part relative to the first axis 141*a*, the second axis 141*b*, and the third axis 141*c*, or in another suitable manner.

The current position 252 may be determined by tracking a change in position over time relative to a known starting position. Thus, the current position 252 of the end part 104 may be tracked over time relative to a known starting position of the end part 104. As an example, an updated value of the current position 252 may be determined by adding a change in position to the previous value of the current position. The known starting position of the end part 104 may be a home position (e.g., determined by a sensor) or may be calibrated. The change in position of the end part 104 can be determined in the manner previously described, such as by using the motion signals from the motion sensors 114 and/or the position signals from the position encoders 138 of the actuator system 110.

The external force 254 includes information (e.g., a numerical value) that represents a direction and/or a magnitude a force applied to the device (e.g., to end part 104) by the user. As an example, the external force 254 may include a value that represents the magnitude of the force applied to the end part 104 by the user and may also include information that identifies a direction along which the force is applied. The magnitude and/or direction of the external force 254 may be determined in the manner previously described. As examples, the external force 254 may be determined (e.g., sensed) based on the motion signals from the motion sensors 114, based on the position signals from the position encoders 138 of the actuator system 110, based on current draw by the actuators of the actuator system 110, and/or based on other information that is available to the controller 108. The magnitude may be expressed as multiple component values that each correspond to a respective degree of freedom (e.g., an axis).

The direction along which the external force 254 is applied may correspond to a single axis of movement, or to two or more axes of movement. In one example, the direction of the external force 254 is described by an angle in three degrees of freedom relative to the end part 104, relative to the base part 102, or relative to another frame of reference. As another example, the direction of the external force 254 may be expressed with respect to the first axis 141*a*, the second axis 141*b*, and the third axis 141*c* of the device 100.

The controller 108 is configured to determine a desired position 256. The desired position describes a position of the device 100 to be achieved by the actuator system 110, either by movement of the device 100 (e.g., rotation of the device 100 with respect to the external structure 105), or by movement of a portion of the device 100. As an example, the desired position 256 may be a desired position for the end part 104 with respect to the base part 102.

The desired position 256 may be dependent on how the user is interacting with the device 100, whether an operating system function or application function is attempting to exercise control over the position of the end part 104, and/or based on other circumstances. Thus, the controller 108 may be configured to operate the device 100 according to multiple operating modes that each correspond to a different way of determining the desired position 256. The controller 108 may determine which operating mode based on circumstances observed by the controller 108, for example, using the sensors of the device 100, based on inputs provided to the controller 108 by the user, based on commands received from the operating system of the device 100, based on commands received from a non-operating system software application that is executed by the controller 108, or based on other suitable information. Examples of conditions under which operating modes may be selected for use by the controller 108 are described further herein with reference to examples of operating modes.

A first operating mode for determination of the desired position 256 corresponds to maintaining a current position of the end part 104 with respect to the base part 102. The first operating mode may be utilized by the controller 108 when there is no external force applied to the end part 104. The first operating mode is intended to operate the actuator system 110 in a manner that causes the end part 104 to resists movement away from the current position 252 (e.g., in opposition to gravity). In the first operating mode, the desired position 256 for the end part 104 may be set equal to the current position 252. Setting the desired position 256 to the current position 252 may cause the operation of the actuator system 110, by the controller 108, to such that stall torque is applied by the first actuator 132*a*, the second actuator 132*b*, or the third actuator 132*c* of the device 100 (e.g., the actuators are controlled to resist rotation). Thus, the actuator system 110 may be controlled in the first operating mode so that the end part 104 is rigidly supported with respect to the base part 102 by the member 106 and does not move with respect to the base part 102.

A second operating mode for determination of the desired position 256 corresponds to actuated repositioning of the end part 104 with respect to the base part 102. The second operating mode may be utilized by the controller 108, for example, when a specific position for the end part 104 has be commanded by an operating system function, an application function, or otherwise. The controller 108 may use the commanded position to determine the desired position 256. As an example, the controller 108 may determine the desired position 256 at each of multiple time steps based on a desired acceleration or velocity for the end part 104 (which may be specified by device settings or in another suitable manner), and may continue to update the desired position 256 as the end part 104 moves, until the current position 252 reaches the commanded position.

A third operating mode for determination of the desired position 256 corresponds to manual repositioning of the end part 104 with respect to the base part 102. The third operating mode may be used when the user is manually repositioning the end part 104 with respect to the base part 102. The controller 108 may utilize the third operating mode in response to determining that that the user intends to reposition the end part 104. As one example, the controller 108 may utilize the third operating mode when the user is touching the end part 104, which may be determined using touch sensors, the position signal from the motion sensors 114, or another suitable sensing method. As another example, the controller 108 may utilize the third operating mode in response to detecting that an external force (e.g., other than gravity) is applied to the end part 104, which can be detected, for example, by current draw by the actuator system 110, since current draw is proportional to torque. As another example, the controller 108 may utilize the third operating mode in response to determining that a tracking error between the current position 252 and the desired position 256 of the end part 104 has exceeded a threshold value, thereby indicating that the end part 104 is being subjected to an external force. Subsequently, the controller 108 can determine that repositioning has been completed (e.g., movement stops or the external force 254 falls below a threshold value), and the controller 108 may exit the third operating mode, such as by transitioning to the first operating mode to maintain the position of the device 100.

In the third operating mode, the controller 108 may forego control according to the desired position 256 so that the user is able to manually reposition the end part 104 with respect to the base part 102. The actuator system 110 may instead be controlled to apply force feedback (e.g., approximating a friction force) to provide a natural sensation to the user during manual repositioning of the base part 102 with respect to the end part 104. Appropriate sensations may range from a free-wheeling sensation, to a notched or ratchet-like feedback, to damped feedback that mimics a resisting force.

While the first operating mode, the second operating mode, and the third operating mode are described above, it should be recognized that these are examples. Different and/or additional techniques for determining the desired position 256 for the device 100 and/or otherwise exercising control over the actuator system 110 may be used.

The force command 250 is determined by the controller 108 based on a positioning force 258, a feedback force 260, and a haptic output force 262. Other component forces and/or other information may also be utilized for determination of the force command 250.

Determination of the force command 250 will be described further herein.

The controller 108 is configured to determine the positioning force 258 for one or more actuators of the actuator system 110 according to the desired position 256. The positioning force 258 is a force that is intended to be applied by the actuator system 110 for the purpose of maintaining the device 100 in a desired position and/or moving the device 100 to a desired position. In some implementations, the positioning force 258 may be configured to maintain the end part 104 in a desired position with respect to the base part 102. In some implementations, the positioning force 258 may be configured to move the end part 104 with respect to the base part 102. For example, determining the positioning force 258 may include, this includes determining the positioning force 258 to according to the desired position 256 for the end part 104 with respect to the base part 102.

During operation in the first operating mode, in which the desired position 256 corresponds to maintaining the device 100 in the current position 252, the magnitude of the positioning force 258 is determined by the controller 108 in a manner that corresponds to no movement of the end part 104. This can be determined by closed loop control, by adjusting the positioning force 258 iteratively while monitoring the current position 252, wherein the adjustments increase or decrease the positioning force in a manner that maintains the current position.

During operation in the second operating mode, the desired position 256 is a commanded position that the actuator system 110 is intended to move the device 100 to. In this mode, while the desired position 256 is different than the current position 252, the positioning force 258 may be set to a value that causes operation (e.g., rotation) of one or more of the actuators of the actuator system 110 in a direction that is consistent with moving the device 100 toward the desired position 256, such as by causing the current position 252 to change so that the difference between the current position 252 and the desired position 256 decreases.

During operation in the third operating mode, the controller 108 determines the positioning force 258 in a manner that allows repositioning of the device 100 with respect to one or more degrees of freedom of the device 100, such as the first axis 141*a*, the second axis 141*b*, or the third axis 141*c*. As an example, the positioning force 258 may be determined to allow repositioning of the end part 104 with respect to the base part 102 in response to the external force 254 being applied to the end part 104 by a user along a first axis. This may include removing the positioning force 258 with respect to the axis or axes with respect to which the end part 104 is being repositioned so that the repositioning movement is not restrained along those axes. Concurrently, the positioning force 258 may be maintained with respect to a second axis that is not being repositioned (e.g., the user has shown not intent to reposition the axis, such as by application of a force above a threshold), and the position of the end part 104 with respect to the second axis may thereby be maintained.

In an example scenario of manual repositioning of the end part 104, the user may apply the external force 254 to the end part 104 by pushing a side surface of the end part 104 in a manner that corresponds to rotation of the end part 104 around the first axis 141*a*. Prior to application of the external force 254, the controller 108 may be controlling the actuator system 110 in a manner that corresponds to maintaining the position of the end part 104 with respect to the base part 102 (e.g., according to the first operating mode). In response to sensing the application of the external force 254, the controller 108 switches to the third operating mode to allow repositioning. This may include reducing the strength of the positioning force 258 or omitting the repositioning force along one or more axes with respect to the which the external force 254 is applied by the user. In this way, the controller 108 may determine the positioning force 258 to allow repositioning of the end part 104 in response to the external force 254 that is applied to the end part 104 by a user along a first axis, such as the first axis 141*a* in this example. If the application of the external force 254 does not correspond to application of force along one or more other axes, such as the second axis 141*b* and the third axis 141*c*, the positioning force 258 may be maintained at a level that resists movement along those axes, as per the first control mode. This allows the controller 108 to maintain the position of the end part 104 with respect to the first axis 141*a* and/or the second axis 141*b* by applying the positioning force 258 to those axes in a manner that resists movement along them, while reducing or removing the positioning force 258 that is applied to the first axis.

The controller 108 is configured to determine the feedback force 260 in order to apply a resisting force using the actuator system 110 while the device 100 is being manually repositioned. As an example, the feedback force 260 may be determined in a manner that simulates a friction force so that the user does not reposition may exercise appropriate control over the position of the device 100, for example, so that portions of the device 100 do not move too quickly if bumped. The magnitude of the feedback force 260 may be a predetermined value, may be determined based on the external force 254, may be determined based on the acceleration of the end part 104, may be determined based on the velocity of the end part 104, or may be determined in another manner.

The haptic output force 262 is intended to provide haptic output (e.g., haptic feedback) to the user while the user is in contact with device 100. This may include haptic output that is independent of movement of the device 100, and may be applied while the user is in contact with the device 100 both while the device 100 is being repositioned (e.g., the position of all or part of the device 100 is changing) and while the device is not being repositioned (e.g. the position of all or part of the device 100 is not changing.

The controller 108 is also configured to determine the haptic output force 262 and apply the haptic output force 262 to the device 100 in a manner that can be perceived by the user by operation of the actuator system 110. As an example, the controller 108 may cause the actuator system 110 to output the haptic output force 262 by incorporating the haptic output force 262 in the force command 250 and transmitting the force command 250 to the actuator system 110 in a manner that causes operation of the actuator system 110.

The magnitude of the haptic output force 262 may be determined by the controller 108 based on a haptic output pattern 264. The haptic output pattern 264 may describe a sequence of haptic sensations, such as vibration, motion, or resistance. The haptic output pattern 264 may be defined by a series of pules, each having a magnitude, an intensity, and a duration. The haptic output pattern 264 may include intervals between successive pulses during which there is no output. These intervals may be coded in the haptic output pattern 264 as pulses of zero magnitude, or in any other suitable way. The haptic output pattern 264 may be predetermined or may be determined dynamically at the time that it is output. In some implementations, the haptic output pattern 264 also specifies directions in which the haptic output force 262 is applied such as by selective application of the haptic output force 262 along the first axis 141*a*, the second axis 141*b*, and the third axis 141*c* according to the haptic output pattern.

In some implementations, the haptic output force 262 may vary dependent on a source of the haptic output pattern 264. As an example an operating system of the device 100 may be executed by the controller 108 and may utilize a first group of haptic output patterns, from which the haptic output pattern 264 is selected. The controller 108 may also execute a first software application, and when the first software application is being executed by the controller 108, the first software application may cause use of a second group of haptic output patterns, from which the haptic output pattern 264 is selected, where the second group of haptic output patterns differs from the first group of haptic output patterns. The controller 108 may also execute a second software application, and when the second software application is being executed by the controller 108, the second software application may cause use of a third group of haptic output patterns, from which the haptic output pattern 264 is selected, where the third group of haptic output patterns differs from the first group of haptic output patterns and the second group of haptic output patterns. Thus, the controller 108 may be configured to receive information defining the haptic output pattern 264 from a software application that is executed by the controller 108.

The haptic output pattern 264 may be a time-based pattern or may be a position-based pattern. In implementations in which the haptic output pattern 264 is a time-based pattern, the haptic output pattern 264 is used by the controller 108 to apply the haptic output force 262 as a function of time relative to a starting time for the haptic output pattern 264. Thus, in a time-based pattern, the pulses of the haptic output pattern 264 may each have a starting time that is expressed as a time relative to the start time of the haptic output pattern 264, and a time-based duration. This may be expressed in any suitable format, and it should be understood that the time-based playback speed of the haptic output pattern 264 may be varied.

In implementations in which the haptic output pattern 264 is a position-based pattern, the haptic output pattern 264 is used by the controller 108 to apply the haptic output force 262 as a function of the position of the device 100 relative to a starting position for the device 100. As an example, the haptic output force 262 may be applied using the haptic output pattern 264 according to a position of the end part 104 relative to a starting position for the end part 104. Thus, in a position-based pattern, the pulses of the haptic output pattern 264 may each have a starting position that is expressed as a position relative to the start position of the haptic output pattern 264, and a position-based duration. The haptic output pattern 264 may be expressed in any suitable format, and it should be understood that a playback scale of a particular position-based version of the haptic output pattern 264 may be varied. Thus, the haptic output pattern 264 may be applied as a function of position relative to a starting position for the haptic output pattern 264.

Figure 3:
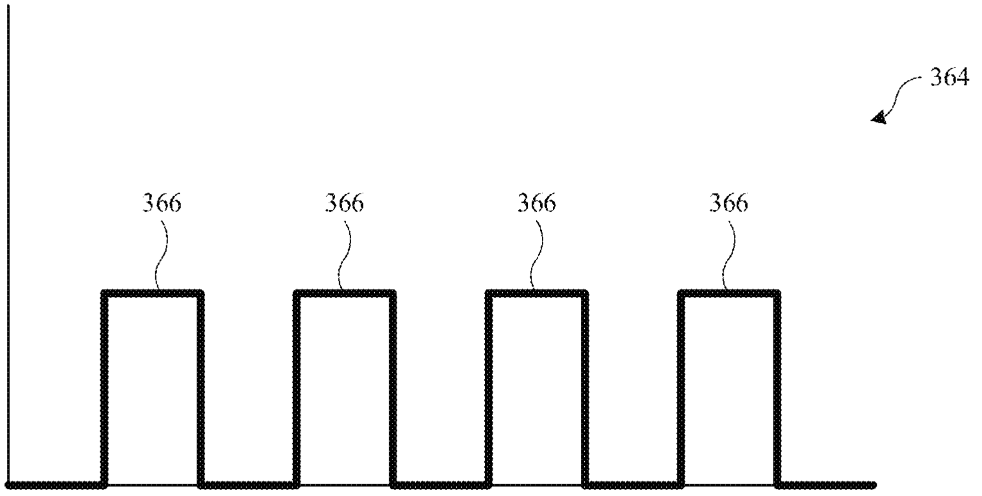
FIG. 3 is a graph of an example of a haptic output pattern.

A series of pulses that is included in the haptic output pattern 264 may be configured to convey a particular meaning for the haptic output pattern 264. FIG. 3 shows an example of a haptic output pattern 364. The haptic output pattern 364 is depicted in terms of magnitude on the vertical axis and time or position on the horizontal axis. The haptic output pattern 364 includes pulses 366, which are identical repeating pulses in the illustrated example. Thus, in this implementation, all of the pulses 366 have the same duration, the same magnitude, and are spaced from each other by pauses of the same duration, thus, the haptic output pattern 364 includes arrangement of the pulses 366 according to a constant frequency with respect to one of time or position.

Figure 4:
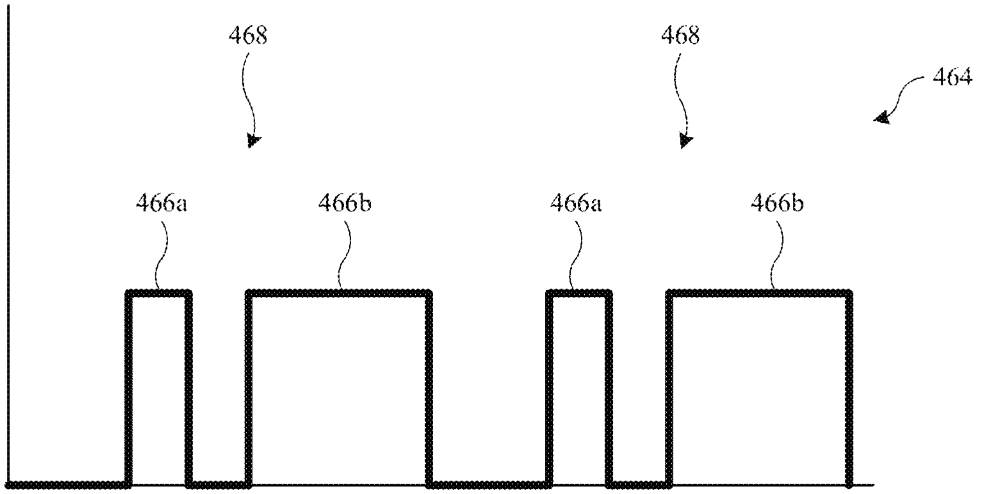
FIG. 4 is a graph of an example of a haptic output pattern.

FIG. 4 shows an example of a haptic output pattern 464. The haptic output pattern 464 is depicted in terms of magnitude on the vertical axis and time or position on the horizontal axis. The haptic output pattern 464 includes pulse groups 468 that include pulses. The pulse groups 468 are identical repeating pulse groups that each include two or more different pulses. All of the pulse groups 468 of the haptic output pattern 464 are identical to each other. In the illustrated implementation, each of the pulse groups 468 includes a short pulse 466*a* and a long pulse 466*b* having different durations with respect to either time or position. The pulses of the pulse groups 468 could instead be pulses of identical duration with respect to time or position, but of different magnitudes.

In some implementations, the haptic output pattern 264 includes a haptic output function. A haptic output function may vary the haptic output force 262 based on conditions associated with the device 100, such as the position of the device 100, the acceleration or velocity of a portion of the device 100, the magnitude of the external force 254, or other conditions. The haptic output function may be configured to allow the controller to determine the haptic output force 262 in a manner that is intended to simulate a mechanical system. As an example, the haptic output function may simulate the feel of a spring biased hinge, or the haptic output function may simulate the feel of a mechanical component such as a ratchet wheel (e.g., to provide a sensation similar to the "tick-tick-tick" sensation of turning a watch crown). Other types of systems may be simulated using the haptic output function.

The controller 108 may output the haptic output force 262 in various directions relative to the device 100. As previously described, the actuator system 110 may apply forces in multiple linear and/or rotational degrees of freedom using the first actuator 132*a*, the second actuator 132*b*, and the third actuator 132*c* thereof. This can include modulation of the motion or resistance at one or more axes of the device 100, such as the first axis 141*a*, the second axis 141*b*, and the third axis 141*c* defined by the member 106.

In the same way that force can be applied to move the device 100 using these axes, the haptic output force 262 can be output with respect to multiple axes, such as by transmitting commands to the actuator system 110 that cause the haptic output force 262 to be applied to the first axis 141*a*, the second axis 141*b*, and the third axis 141*c*. It should be understood that the controller 108 may coordinate to application of the haptic output force 262 to the movement axes of the device 100 to apply forces with respect to an arbitrary coordinate system, such as by applying forces along X, Y, Z and pitch, roll, yaw axes in a cartesian coordinate space.

In some implementations, the controller 108 applies the haptic output force 262 along a first axis, such as the first axis 141*a*. As an example, the controller 108 may determine the haptic output force 262 in a manner that causes the actuator system 110 to apply the haptic output force along a single axis. In such implementations, the controller 108 may cause the haptic output force 262 to be output by rotation around the first axis 141*a*, the second axis 141*b*, or the third axis 141*c* of the device 100 using one of the first actuator 132*a*, the second actuator 132*b*, or the third actuator 132*c*. In this implementation, the controller 108 may output the haptic output force 262 along a single axis when the user is in contact with the device 100 (e.g., by contact with the end part 104), while the user is not repositioning the device 100.

In another example of application of the haptic output force 262 along a first axis, when the user is repositioning the device 100, the controller may sense the external force 254, including a direction of the external force 254. In response to determining that the external force 254 is applied to the device 100 (e.g., to the end part 104) along a first axis (e.g., the first axis 141*a*), the controller 108 may determine the haptic output force 262 such that it is applied along the first axis (e.g., the first axis 141*a*) in opposition to a direction of the external force 254 that was applied to the device 100 (e.g., the end part 104) by the user. Thus, the external force 254 may be applied in a first direction with respect to the first axis 141*a* to reposition the end part 104, and the haptic output force 262 may be applied in a second direction with respect to the first axis 141*a*, in opposition to the first direction, in order to provide feedback to the user.

In some implementations, when the user is applying the external force 254 along a first axis (e.g., the first axis 141*a*) to reposition the actuator system 110, the haptic output force 262 may be applied along a second axis that is different than the first axis. For instance, the second axis may be orthogonal to the first axis.

As an example, in response to application of the external force 254 along the first axis 141*a*, the controller 108 may output the haptic output force 262 along the second axis 141*b* using the second actuator 132*b*. Alternatively, the controller 108 may apply the haptic output force 262 in a frame of reference that corresponds to a portion of the device 100, such as the end part 104, for example, by sensing that the external force 254 is generally transverse (e.g., side-to-side) with respect to a plane defined by the touch sensitive display 116 of the end part 104, and in response, the controller 108 may apply the haptic output force 262 along a different axis, such as an axis that corresponds to a top to bottom direction relative to the touch sensitive display 116, or such as an axis that corresponds to an into or out of the screen direction relative to the touch sensitive display 116.

The positioning force 258, the feedback force 260, and the haptic output force 262 are utilized to determine the force command 250. The force command 250 may be configured to cause the actuator system 110 to apply force using one or more of the first actuator 132*a*, the second actuator 132*b*, and the third actuator 132*c* according to a magnitude and direction specified by the force command 250. As an example, the magnitude specified by the force command 250 may be a motor torque, which is proportional to current draw for an electric motor and can therefore be controlled by regulating motor current. The force command 250 may include separate instructions that control the force applied by the first actuator 132*a*, the second actuator 132*b*, and the third actuator 132*c* individually. Thus, the controller 108 is configured to provide haptic output to a user of the device 100 by controlling operation of one or more actuators of the device 100 according to the force command 250, while also controlling the position of the end part 104 of the device 100 according to the force command 250.

The controller 108 may determine the force command 250 by combining the positioning force 258, the feedback force 260, and the haptic output force 262. As one example, the positioning force 258 and the haptic output force 262 may be combined by addition. Other techniques may be used to combine the positioning force 258 and the haptic output force 262, such as by using a linear or non-linear combination formula. User preferences may be used to combine the positioning force 258 and the haptic output force 262, such as by scaling the haptic output force 262 according to a user-selected scaling factor to adjust the intensity of the haptic output. The force command 250 may also be determined based on other factors or information, such as by adding another component force that serves a different function in order to define the force command 250 and thereby control the output force of the actuator system 110.

The description herein describes the force command 250 using singular language. It should be understood, however, the force command 250 may include multiple commands, such as commands that are concurrently determined and sent to the first actuator 132*a*, the second actuator 132*b*, and the third actuator 132*c* of the actuator system 110. It should also be understood that the force command 250 will be updated continuously in response to changing conditions, and that the force command 250 is therefore representative of a command that is part of a series of commands, such as commands that are determined and output according to a fixed frequency or a variable frequency. As an example, the actuator system 110 of the device 100 may be controlled according to time steps, and the force command 250 may be determined and sent once per time step or at another suitable frequency. As an alternative, the force command 250 could include one or more continuously-output signals having a value (e.g., magnitude) corresponding to a commanded action for the actuator system 110.

To apply force feedback to the end part 104 based on the force command 250, the force command 250 is provided to the actuator system 110, for example in the form of one of more signals that are configured to cause the first actuator 132*a*, the second actuator 132*b*, or the third actuator 132*c* to operate in a desired manner. Thus, in response to the force command 250, the actuator system 110 may apply the force command to the device 100 (e.g., to the end part 104 thereof), thereby maintaining the position of the device 100, actuating movement of the position of the device 100, allowing manual repositioning of the device 100, and/or applying haptic feedback to the device 100. Thus, for example, the controller 108 may be configured to provide haptic output according to the haptic output force 262 by controlling operation of one or more actuators of the actuator system 110, such as the first actuator 132*a*, the second actuator 132*b*, or the third actuator 132*c*, according to the force command 250.

Figure 5:
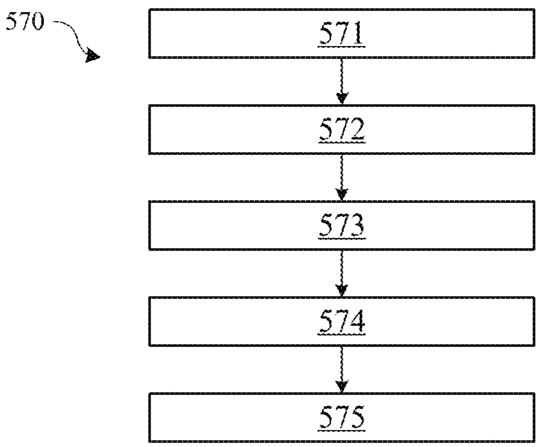
FIG. 5 is a block diagram of haptic output control.

FIG. 5 is a block diagram of a haptic output control process 570. The haptic output control process 470 may be performed using the device 100, as previously described, such as an implementation of the device 100 that includes the end part 104, the base part 102, the member 106, the controller 108, and the actuator system 110. The haptic output control process 570 may be implemented, for example, in the form of computer program instructions that are executable by a computing device (e.g., comprising one or more processors and a memory to store the computer program instructions), such as the controller 108. The program instructions may be embodied in the form of a non-transitory computer-readable storage device, or in another suitable form.

Operation 571 includes sensing an external force that is applied by a user to reposition the device. The external force 254 may be applied, for example, to reposition the end part 104 with respect to the base part 102 around a first axis, such as the first axis 141*a* of the device 100.

Operation 572 includes determining the positioning force 258 for one or more actuators of the actuator system 110 of the device 100. In some implementations, the positioning force 258 is determined is determined to allow repositioning of the end part 104 in response to the external force 254. As an example, the positioning force 258 may be determined to allow repositioning of the end part 104 by the user with respect to the base part 102 along a first axis, such as the first axis 141*a* or another axis relative to the device 100. In situations in which the external force 254 is applied to reposition a portion of the device 100 (e.g., the end part 104 thereof), the positioning force 258 may be modified to allow movement (e.g., rotation) with respect to this axis, but the positioning force 258 may be maintained with respect to one or more additional axes of the device 100 in order to maintain the position of the device 100 (e.g., a position of the end part 104 thereof) with respect to such axes.

Operation 573 includes determining the haptic output force 262. The haptic output force 262 may be determined based on the haptic output pattern 264 in the manner previously described. In some implementations of operation 573, the controller 108 may be further configured to receive information defining the haptic output pattern 264 from a software application executed by the controller 108. In some implementations of operation 573, the controller 108 may be further configured to receive information defining the haptic output pattern 264 from an operating system of the device 100 that is executed by the controller 108.

In operation 573, the haptic output pattern 264 may be applied as a function of time relative to a starting time for the haptic output pattern 264, or as a function of position relative to a starting position for the haptic output pattern 264. The haptic output pattern 264 may include identical repeating pulses, or identical repeating pulse groups that each include two or more different pulses, as described with respect to FIGS. 3-4. In some implementations of operation 573, the haptic output force 262 is determined based on a haptic output function intended to simulate a mechanical system.

Operation 574 includes determining the force command 250. The force command 250 may be determined by combining the positioning force 258 and the haptic output force 262 as previously described. The feedback force 260 may also be included in the force command 250 in some implementations, by combining the positioning force 258, the feedback force 260, and the haptic output force 262, as previously described.

Operation 575 of the haptic output control process 570 includes providing haptic output by controlling operation of one or more actuators of the actuator system 110 to apply force to the device 100 or a portion of the device 100. As an example, operation 575 may include controlling operation of the actuator system 110 to apply force to the end part 104 according to the force command 250, thereby applying the haptic output force 262 to the end part one and optionally applying the positioning force to ⅝ and slash or the feedback force 260 to the end part 104 of the device 100. In some implementations of operation 575, the haptic output force 262 is applied along a first axis in opposition to a direction of the external force 254 that is applied along the first axis. In some implementations of operation 575, the haptic output force 262 is applied along a second axis that is different than the first axis, such as an axis that is orthogonal to the first axis.

What is claimed is:

1. A device, comprising:

a member that connects a base part of the device to an end part of the device to allow movement of the end part;

one or more actuators that are configured to apply force to the end part of the device; and a controller configured to:

apply a positioning force to maintain a current position of the end part, while maintaining the current position of the end part using the positioning force, sense an external force that is applied by a user to reposition the end part around a first axis, modify the positioning force to allow repositioning of the end part in response to determining that the external force exceeds a threshold value, and while allowing repositioning of the end part, provide haptic output by controlling operation of the one or more actuators.

2. The device of claim 1, wherein the haptic output is provided according to a haptic output pattern.

3. The device of claim 2, wherein the controller is further configured to receive information defining the haptic output pattern from a software application executed by the controller.

4. The device of claim 2, wherein the haptic output pattern is applied as a function of time relative to a starting time for the haptic output pattern.

5. The device of claim 2, wherein the haptic output pattern is applied as a function of position relative to a starting position for the haptic output pattern.

6. The device of claim 1, wherein the haptic output is provided according to a haptic output function intended to simulate a mechanical system.

7. The device of claim 1, wherein, in response to the external force, the controller modifies the positioning force to remove the positioning force with respect to the first axis and to maintain the positioning force with respect to a second axis that is different than the first axis.

8. The device of claim 1, wherein the member is configured to allow the repositioning of the end part by rotation of the end part relative to the base part.

9. The device of claim 1, wherein the haptic output is applied along the first axis in opposition to a direction of the external force applied to the end part by the user.

10. The device of claim 1, wherein the haptic output is applied along a second axis that is different than the first axis.

11. The device of claim 1, wherein the controller is configured to sense the external force based on a current draw of the one or more actuators.

12. The device of claim 1, wherein the controller is configured to sense the external force based on a tracking error between the current position of the end part and a desired position of the end part.

13. A method, comprising:

applying a positioning force to maintain a current position of an end part of a device;

while maintaining the current position of the end part using the positioning force, sensing an external force that is applied by a user to reposition the end part of the device around a first axis;

modifying the positioning force for one or more actuators to allow repositioning of the end part in response to determining that the external force exceeds a threshold value; and while allowing repositioning of the end part, providing haptic output by controlling operation of the one or more actuators.

14. The method of claim 13, wherein providing the haptic output further comprises using a haptic output pattern.

15. The method of claim 14, wherein providing the haptic output further comprises receiving information defining the haptic output pattern from a software application.

16. The method of claim 14, wherein the haptic output pattern is applied as a function of time relative to a starting time for the haptic output pattern.

17. The method of claim 14, wherein the haptic output pattern is applied as a function of position relative to a starting position for the haptic output pattern.

18. The method of claim 13, wherein providing the haptic output further comprises providing the haptic output based on a haptic output function intended to simulate a mechanical system.

19. The method of claim 13, wherein modifying the positioning force further comprises modifying the positioning force to remove the positioning force with respect to the first axis and to maintain the positioning force with respect to a second axis that is different than the first axis.

20. A non-transitory computer-readable storage device comprising program instructions, wherein the program instructions, when executed by a processor, cause the processor to perform operations, the operations comprising:

applying a positioning force to maintain a current position of an end part of a device;

while maintaining the current position of the end part using the positioning force, sensing an external force that is applied by a user to reposition the end part of the device around a first axis;

modifying the positioning force for one or more actuators to allow repositioning of the end part in response to determining that the external force exceeds a threshold value; and while allowing repositioning of the end part, providing haptic output by controlling operation of the one or more actuators.

21. The non-transitory computer-readable storage device of claim 20, wherein the haptic output is provided according to a haptic output pattern.

22. The non-transitory computer-readable storage device of claim 21, further comprising receiving information defining the haptic output pattern from a software application.

23. The non-transitory computer-readable storage device of claim 21, wherein the haptic output pattern is applied as a function of time relative to a starting time for the haptic output pattern.

24. The non-transitory computer-readable storage device of claim 21, wherein the haptic output pattern is applied as a function of position relative to a starting position for the haptic output pattern.

25. The non-transitory computer-readable storage device of claim 20, wherein a member connects a base part of the device to the end part of the device to allow movement of the end part, and the member is configured to allow the repositioning of the end part by rotation of the end part relative to the base part.

* * * * *